United States Patent [19]
Taube

[11] 3,732,932
[45] May 15, 1973

[54] SIDE DRAFT CONTROL SYSTEM FOR A TRACTOR AND EARTH-WORKING IMPLEMENT

[75] Inventor: Robert Otto Taube, Moline, Ill.
[73] Assignee: Deere & Company, Moline, Ill.
[22] Filed: May 17, 1971
[21] Appl. No.: 143,890

[52] U.S. Cl. .................172/7, 172/9, 172/239, 172/311, 172/413
[51] Int. Cl. .................................A01b 63/112
[58] Field of Search.................172/9, 7, 8, 4.5, 172/239, 413, 421, 450, 451, 311, 316; 280/461 A, 446 R; 60/97 E; 91/171

[56] References Cited

UNITED STATES PATENTS

| | | | |
|---|---|---|---|
| 2,755,722 | 7/1956 | Fraga | 172/239 |
| 3,523,699 | 8/1970 | Sinkule et al. | 172/311 X |
| 3,630,290 | 12/1971 | Williams et al. | 172/7 |
| 3,233,909 | 2/1966 | Boone | 172/4.5 |
| 3,517,747 | 6/1970 | Fischer | 170/7 |
| 3,627,053 | 12/1971 | Hook et al. | 172/9 |
| 3,374,842 | 3/1968 | Smith, Jr. | 172/7 |
| 2,883,777 | 4/1959 | Gurries et al. | 172/4.5 |
| 3,627,059 | 12/1971 | Jackson et al. | 172/413 |
| 3,120,799 | 2/1964 | Strnad et al. | 60/97 E |

Primary Examiner—Robert E. Pulfrey
Assistant Examiner—Stephen C. Pellegrino
Attorney—H. Vincent Harsha, Harold M. Knoth, William A. Murray, John M. Nolan, Raymond L. Hollister, Jimmie R. Oaks & John O. Hayes

[57] ABSTRACT

A side draft control device for wide implements automatically adjusts the implement wheels to raise the high draft side of the implement and lower the low draft side of the implement to maintain a balanced draft load on the tractor and an average working depth of the implement. The system uses lateral movement of the upper link of the tractor hitch to operate switches in the control circuits for a double solenoid valve which selectively and alternately interconnects the cylinders for the implement wheels with the tractor hydraulic pump and reservoir.

16 Claims, 5 Drawing Figures

INVENTOR.
ROBERT O. TAUBE

INVENTOR.
ROBERT O. TAUBE

BY R L Hollister

ATTORNEY

3,732,932

SIDE DRAFT CONTROL SYSTEM FOR A TRACTOR AND EARTH-WORKING IMPLEMENT

CROSS REFERENCE TO RELATED APPLICATION

The present application is related to and contains subject matter common to U.S. application Ser. No. 143,939, filed concurrently herewith.

BACKGROUND OF THE INVENTION

The present invention relates generally to earth-working implements and more particularly relates to the control of draft forces on the implement.

The current trend in agricultural implements is to make the implement wider so that a larger area of ground can be worked with one pass through the field. The use of wider implements has presented problems controlling draft forces. For example, on a wide integral implement there is a good chance that one side of the implement may work deeper than the other due to irregularities in the ground contour. Also, the wider the implement the greater the possibility that the tools on one side of the implement will be working in harder ground than the tools on the other side. These conditions create unbalanced draft loads on a tractor and render it impossible to make straight rows. Attempts have been made to overcome these problems by controlling the working depth of the tools on the implement by gauge wheels on the outer ends of the implement. However, when the tools on one side of the implement are working in harder ground than the tools on the other side of the implement, there are still unbalanced draft loads imposed upon the tractor.

SUMMARY OF THE INVENTION

An object of the present invention is to provide a side draft control system which senses lateral movement of the upper hitch link of the tractor to automatically maintain balanced draft loads on the tractor.

Another object of the present invention is to provide a side draft control system which senses lateral movement of the upper hitch link of the tractor to maintain balanced draft loads on the tractor and which maintains a substantially constant average working depth of the implement while maintaining the balanced draft loads.

Still another object of the present invention is to provide a side draft control system for an agricultural implement which senses lateral movement of the tractor hitch links to actuate a solenoid valve which interconnects hydraulic cylinders controlling the working position of the implement with a source of fluid pressure and a fluid reservoir on the tractor to simultaneously raise the high draft side of the implement and lower the low draft side of the implement to balance draft loads and maintain a substantially constant average working depth of the implement.

A still further object of the invention is to provide a side draft control system for a tractor and implement arrangement which utilizes lateral movement of the tractor hitch links caused by unequal draft forces on opposite sides of the tractor hitch to close switches in the electrical circuits for a double solenoid valve which interconnects hydraulic cylinders controlling the position of the implement on gauge wheels adjustably secured to the implement on opposite sides of the tractor hitch with a source of fluid pressure and a fluid reservoir on the tractor so that the high draft side of the implement is raised and the low draft side of the implement is lowered to balance the draft forces.

Yet another object of the present invention is to provide a side draft control system for an agricultural implement which is responsive to unbalance draft loads on a tractor to raise the high draft side of the implement and simultaneously lower the low draft side of the implement to balance the draft loads, and which is automatically rendered inoperative upon raising of the implement from a working position to a transport position.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figure 1:
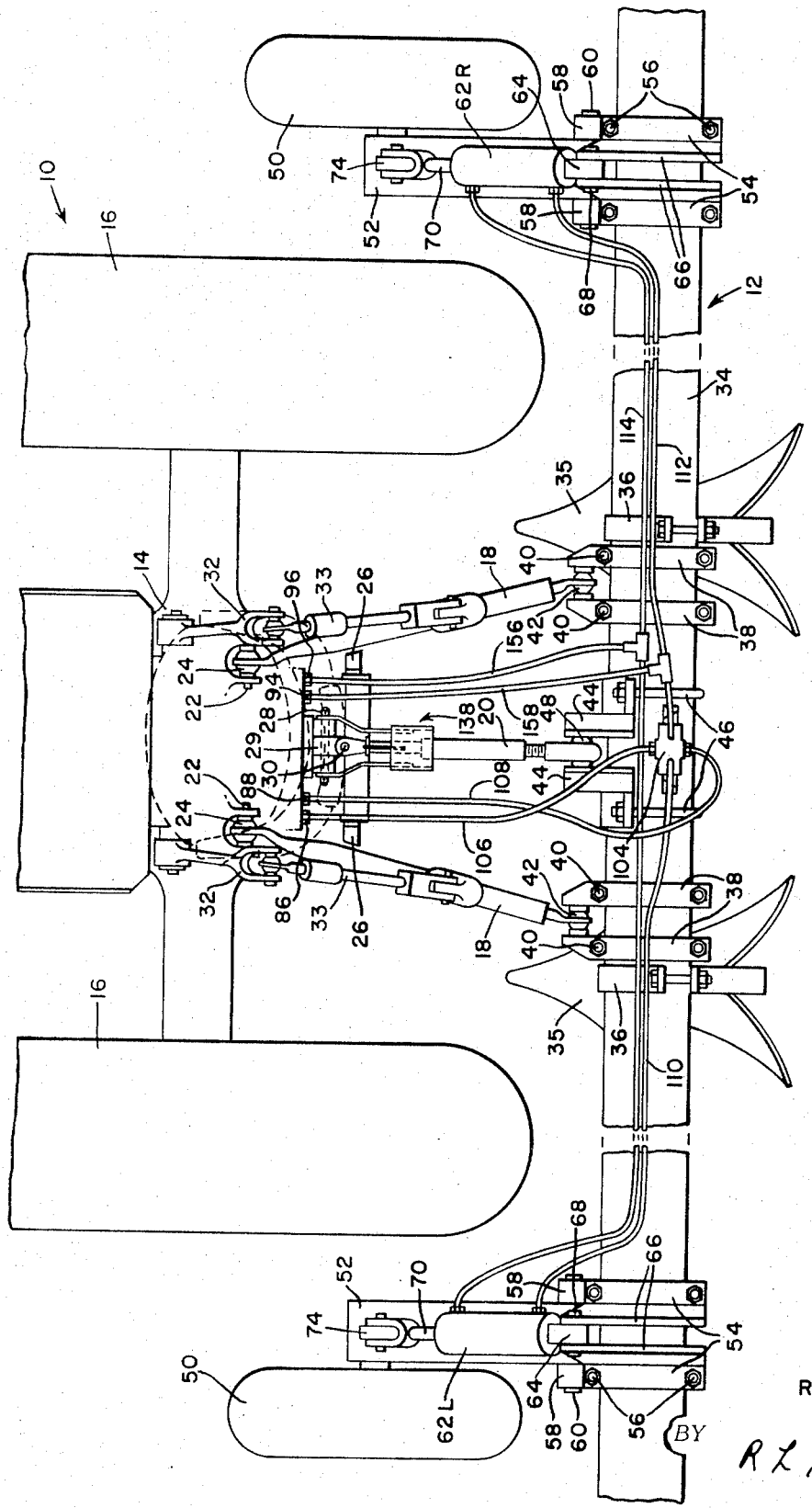
FIG. 1 is a top plan view of a tractor and implement arrangement embodying the side draft control system according to the present invention.
Figure 2:
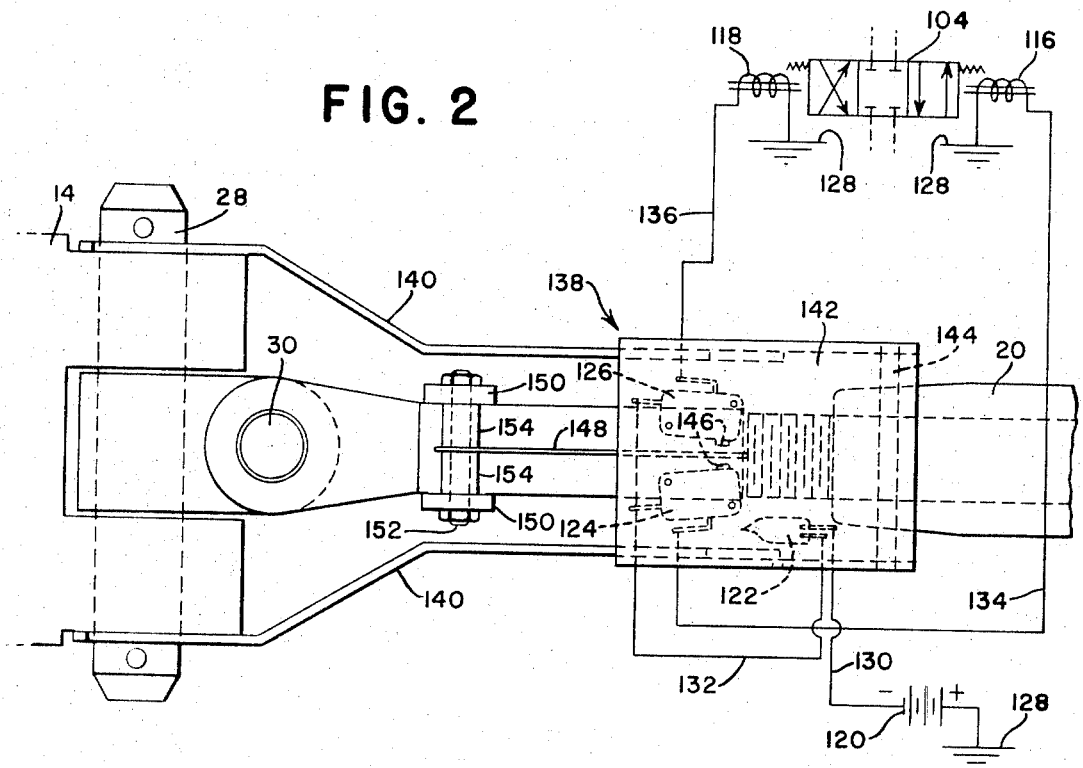
FIG. 2 is an enlarged top plan view of the forward half of the upper tractor hitch link illustrated in FIG. 1 and also a schematic illustration of the electrical circuitry of the side draft control system according to the present invention.
Figure 3:
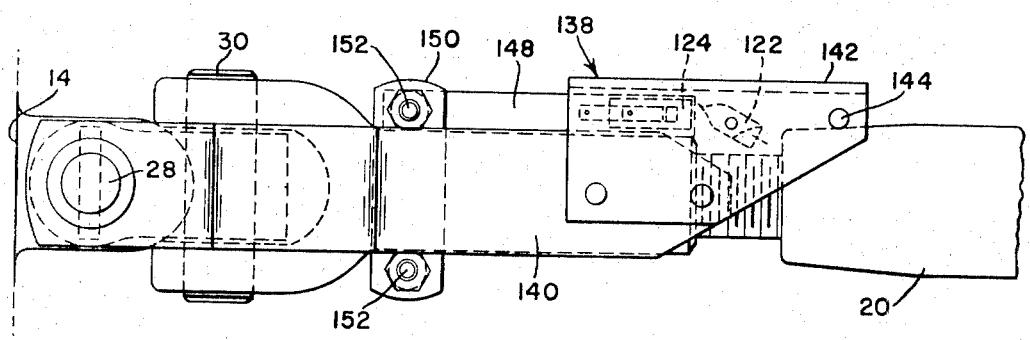
FIG. 3 is a side elevational view of the forward portion of the upper tractor hitch link.

Referring to the drawings, there is disclosed therein a tractor indicated generally at 10 and an implement indicated generally at 12. The tractor 10 is of conventional construction and includes a main chassis 14 supported by rear traction wheels 16 and front steerable wheels (undisclosed). The tractor also has a conventional three-point hitch including a pair of lower draft links 18 and an upper compression link 20. The draft links 18 are connected to a lower portion of the tractor chassis for limited universal movement by pins 22 and balls 24. Lateral movement of the draft links 18 is limited by conventional sway blocks 26. The forward end of the compression link 20 is connected to the tractor chassis for vertical pivotal movement about a first axis 28 and lateral pivotal movement about a second axis 30. The draft links 18 are interconnected with a pair of lift arms 32 by a pair of drop links 33. The lift arms 32 can be moved through a vertical range by a tractor-mounted cylinder (undisclosed) as is conventional to raise and lower the draft links 18.

The disclosed implement 12 includes a transversely elongated frame or toolbar 34 having a plurality of earth-working tools such as lister bottoms 35 secured thereto by clamps 36. For the purpose of simplification, only two lister bottoms are illustrated. A pair of brackets 38 are secured to the toolbar on each side of and equal distances from the fore-and-aft centerline of the toolbar 34 by U-bolts 40. The forward ends of the brackets 40 are apertured and a hitch pin extends through the apertures in each pair of brackets and also through a hitch ball 42 on the rear end of one of the draft links to secure the implement to the draft links. A central mast in the form of a pair of upstanding posts 44 is secured to the center of the toolbar 34 by U-bolts 46 and the rear end of the compression link 20 is secured between the upper ends of the posts 44 by a pin and ball assembly 48.

The three-point connection between the tractor hitch and the implement provides an integral connection so that upon vertical movement of the tractor hitch, the implement is raised and lowered between transport and working positions.

The working position of the implement with respect to the ground surface is controlled by a pair of gauge wheels 50 which are mounted at the opposite ends of the toolbar 34. Each gauge wheel 50 is journaled to the lower free end of a wheel arm 52 which has its upper end pivotally connected to the toolbar 34 by a pair of brackets 54. Each pair of brackets 54 are secured to the tool bar in spaced relationship by U-bolts 56 and each bracket is provided with a bearing 58 on a forward portion thereof. A pivot shaft 60 journaled in the bearings of each pair of brackets 54 provides the pivotal mountings for the respective wheel arms 52.

The position of the toolbar 34 with respect to the gauge wheels 50 and the ground surface can be varied by a pair of double-acting hydraulic cylinders 62L and 62R. Each of the cylinders 62 has an anchor end 64 pivotally mounted between the upper ends of upwardly extending legs 66 of its respective pair of brackets 54 by a pivot pin 68. The rod 70 of a piston and rod assembly 72 extends from the opposite end of each cylinder 62 and is pivotally connected to a lug 74 secured to the wheel arm 52 adjacent the free end thereof. With this construction, it can be seen that extension of one of the cylinders will raise one side of the toolbar on its respective gauge wheel and change the working position of the one side of the toolbar with respect to the ground surface, and retraction of one of the cylinders will lower one side of the toolbar on its respective gauge wheel and vary the working position of the one side of the toolbar with respect to the ground surface.

Fluid is supplied to and exhausted from the hydraulic cylinders 62L and 62R by a conventional hydraulic system forming part of the tractor 10. The conventional tractor hydraulic system is illustrated schematically in FIG. 4 and includes a source of fluid pressure or pump 76, a fluid reservoir 78, a tractor-mounted four-way directional flow control valve 80, a pair of fluid lines 82 and 84 interconnecting the pump 76 and reservoir 78 with one side of the valve 80, and a pair of tractor-mounted remote function outlets 86 and 88 which are connected to the second side of the valve 80 by fluid lines 90 and 92. The illustrated tractor includes a second pair of tractor-mounted remote function outlets 94 and 96 which are connected to one side of a second tractor-mounted four-way directional flow control valve 98 by a pair of fluid lines 100 and 102. The opposite side of the valve 98 is interconnected with the pump 76 and reservoir 78 by the fluid lines 82 and 84.

The remote function outlets 86 and 88 are interconnected with one side of a double solenoid, spring centered, four-way directional flow control valve 104 by a pair of fluid lines 106 and 108. The valve 104 is mounted on the toolbar 34 and its opposite side is interconnected with the anchor ends of the cylinders 62L and 62R by fluid lines 110 and 112. The rod ends of the cylinders 62L and 62R are interconnected by an additional fluid line 114.

When the tractor hydraulic system is to be used with the side draft control system according to the present invention, the valve 80 is moved to the right to interconnect the fluid line 106 with the pump 75 and the fluid line 108 with the reservoir 78. Fluid is then selectively and alternately supplied to and exhausted from the anchor ends of the cylinders 62L and 62R by movement of the valve 104 from its neutral position. The term "alternately" is used herein and in the claims to indicate that when one of the hydraulic cylinders is interconnected with the pump the other hydraulic cylinder is interconnected with the reservoir and vice versa. For example, if the valve 104 is moved to the left of its neutral position, it interconnects the anchor end of the cylinder 62L with the pump 75 and the anchor end of the cylinder 62R with the reservoir 78. This causes the left-hand side of the toolbar 34 to be raised on its gauge wheel and the right-hand side of the toolbar to be lowered an equal amount on its gauge wheel. With one side of the toolbar being raised and the other side being lowered, the average working position of the toolbar with respect to the ground surface is maintained substantially constant. Movement of the valve 104 to the right of its neutral position interconnects the anchor end of the cylinder 62R with the pump 76 and the anchor end of the cylinder 62L with the reservoir 78 so that the right side of the toolbar is raised and the left side of the toolbar is lowered.

The valve 104 is moved to opposite sides of its neutral position by selective activation of its solenoids 116 and 118. The solenoids 116 and 118 are connected to an electrical source 120, the tractor battery, through a mercury switch 122 and a pair of microswitches 124 and 126 respectively. One terminal of each of the solenoids 116 and 118 is connected to the positive terminal of the electrical source 120 through ground 128. The negative terminal of the electrical source 120 is connected to one terminal of the mercury switch 122 by an electrical line 130 while the second terminal of the mercury switch is connected to one terminal of each of the microswitches 124 and 126 by an electrical line 132. The second terminal of the microswitch 124 is connected to the second terminal of the solenoid 116 by an electrical line 134 and the second terminal of the microswitch 126 is connected to the second terminal of the solenoid 118 by an electrical line 136.

The mercury switch 122 and microswitches 124 and 126 are supported on and carried by a switch support indicated generally at 138. The switch support includes a pair of support arms 140 which have their forward ends pivotally connected to the tractor for vertical movement about the axis 28. The arms 140 extend generally alongside the upper compression link 20 and have their rear ends interconnected by an inverted U-shaped switch base 142. A spring pin 144 extends between the legs of the switch base 142 and engages the top surface of the compression link 120 to maintain the bight of the switch base spaced above the compression link.

The microswitches 124 and 126 are secured to the base 142 so that the switch buttons 146 are positioned on opposite sides of and face a vertical plane extending through the longitudinal centerline of the upper compression link 20. The mercury switch 122 is secured to the switch base 142 in an attitude so that it is closed when the tractor hitch is adjusted within the normal working range of the implement 12 and open when the tractor hitch and implement are raised to a transport position.

The microswitches 124 and 126 are selectively closed by an elongated spring strap 148 which is positioned on top of the forward end of the compression link 20, has its rear end between the switch buttons 146, and has its forward end rigidly secured to the compression link 20. For the purpose of securing the forward end of the spring strap to the compression link, a pair of clamp plates 150 are secured to the sides of the compression link by bolts 152 which extend across the top and bottom of the compression link. The forward end of the spring strap 148 is apertured and the upper bolt 152 extends through the aperture in the spring strap. The spring strap is maintained in a centered position on the upper bolt 152 by a pair of spacers 154 mounted on the upper bolt 152 and positioned between the clamp plates 150 and spring strap 148. With the spring strap 148 secured to the compression link 20, lateral movement of the compression link about the pivot 28 will cause lateral movement of the spring strap so that the rear end of the spring strap contacts one of the switch buttons 146 and closes one of the switches 124 or 126. Should the compression link move laterally a distance greater than is required to close one of the switches 124 and 126, the rear end of the spring strap 148 will yield to prevent damage to the switches 124 and 126.

The operation of the side draft control system thus far described is as follows. To start a pass through the field, the operator lowers the tractor hitch and hence the implement until the toolbar 34 is supported by the gauge wheels 50 and the tools 35 are working in the ground. As long as the draft forces on the opposite sides of the tractor hitch are equal, the side draft control system remains in the neutral condition illustrated in the drawings. However, should the draft forces on opposite sides of the tractor hitch become unbalanced due, for example, to the tools 35 on one side of the toolbar 34 working in harder ground than the tools on the other side, the draft link 18 on the high draft side of the implement will be forced against its sway block and, due to the three-point connection between the tractor hitch and implement, the upper compression link 20 will be moved in the same direction so that the spring strap 148 will close one of the switches 124 and 126. For example, if the lister bottoms 35 on the right-hand side of the toolbar 34 are working in harder ground than the lister bottoms on the left-hand side of the toolbar, the draft forces on the right-hand side of the tractor hitch will be greater than the draft forces on the left-hand side of the tractor hitch and the right-hand draft link 18 will be forced against its sway block 26. As the right-hand draft link 18 is moved to the left against its sway block 26, the upper compression link 20 is also moved to the left and the spring strap 148 will contact the switch button 146 of the microswitch 124 and close the microswitch 124. Since the tractor hitch is adjusted within the working range of the implement 12, the mercury switch 122 will also be closed so that the solenoid 116 is energized and the valve 104 is moved to the right.

As the valve 104 is moved to the right, it interconnects the anchor end of the cylinder 62R with the pump 76 and the anchor end of the cylinder 62L with the reservoir 78. As fluid from the pump 76 flows into the anchor end of the cylinder 62R, it forces fluid from the rod end of the cylinder 62R to the rod end of the cylinder 62L which in turn forces fluid from the anchor end of the cylinder 62L to the reservoir 78. Thus, as the cylinder 62R extends, the cylinder 62L is retracted an equal amount. Extension of the cylinder 62R raises the toolbar 34 so that the working depth of the tools 35 on the right-hand side of the toolbar is decreased and the draft forces on the right-hand side of the tractor hitch are decreased. As the right-hand side of the toolbar is raised by extension of the cylinder 62R, the left-hand side of the toolbar is lowered by retraction of the cylinder 62L so that the average working depth of all the tools 35 on the toolbar 34 remain substantially constant.

As the draft forces on the opposite side of the tractor hitch again approach a balanced condition due to the raising of the right-hand side of the implement and lowering of the left-hand side thereof, the draft link on the right-hand side of the tractor hitch will move away from its sway block and the upper compression link 20 will move back to a centered position. As the upper compression link 20 moves back to the center position, the spring strap 148 moves away from the microswitch 124 so that the microswitch 124 will open and the solenoid 116 will be deactivated. With the solenoid 116 deactivated, the valve 104 will be returned to its neutral position by its springs. The side draft control system will then remain in the neutral condition until unbalanced draft loads are again encountered. When the implement is raised to a transport position by the power-operated tractor hitch, the rear end of the switch support 138 is pivoted upwardly to change the attitude of the mercury switch 122 and open the mercury switch 122 to render the side draft control system inoperative. Also, if it is desired to use the implement 12 or any other implement without the side draft control system, it is only necessary to raise the switch support 138 about the pivot 28 to a vertical position so that the mercury switch 122 is open and the microswitches 124 and 126 are removed from the upper compression link 20.

Figure 4:
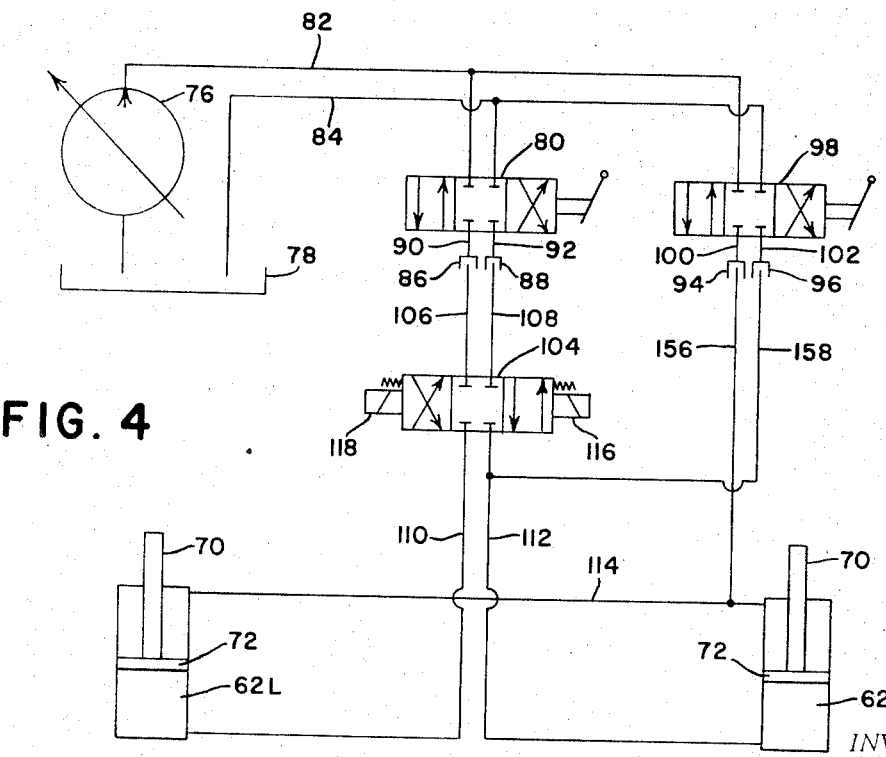
FIG. 4 is a schematic view of the hydraulic system employed in the present invention; and, FIG. 5 is a view similar to FIG. 4 but illustrating a modified hydraulic system.

During operation of the side draft control system, the average working position of the toolbar 34 relative to the ground or the average working depth of the tools remains constant due to one side of the toolbar 34 being raised as the other side of the toolbar 34 is lowered. However, it is often desirable to vary the average working position of the toolbar 34 with respect to the ground so that the working depth of the tools 35 is increased or decreased. This is accomplished by bypassing the valve 104 and interconnecting the opposite ends of one of the cylinders with the pump 76 and reservoir 78. This is accomplished in the manner illustrated in FIGS. 4 and 5. In FIG. 4, a pair of fluid lines 156 and 158 interconnect the remote function outlets 94 and 96 with the fluid lines 114 and 112 respectively. This in effect interconnects the remote function outlet 94 with the rod end of the cylinder 62R and the remote function outlet 96 with the anchor end of the cylinder 62R. When it is desired to lower the average working position of the toolbar 34, the valve 98 is moved to the right so that fluid from the pump 76 is forced to the rod end of the cylinder 62R and fluid from the anchor end of the cylinder 62R is returned to the reservoir 78. As the cylinder 62R retracts, the right side of the toolbar 34 is lowered and the draft forces on the right side of the tractor hitch increase which results in actuation of the valve 104 in the manner previously explained. However, with the valve 98 moved to the right, fluid from the pump 76 which passes through the valve 104 is returned to the reservoir 78 through the fluid line 158, and fluid flowing through the line 156 flows to the rod end of the cylinder 62L forcing fluid from the anchor end of the cylinder 62L back to the reservoir 78 through the valve 104 so that the cylinder 62L is also retracted. If it is desired to raise the average working position of the toolbar 34 with respect to the ground surface, the valve 98 is moved to the left so that both cylinders are extended.

Figure 5:
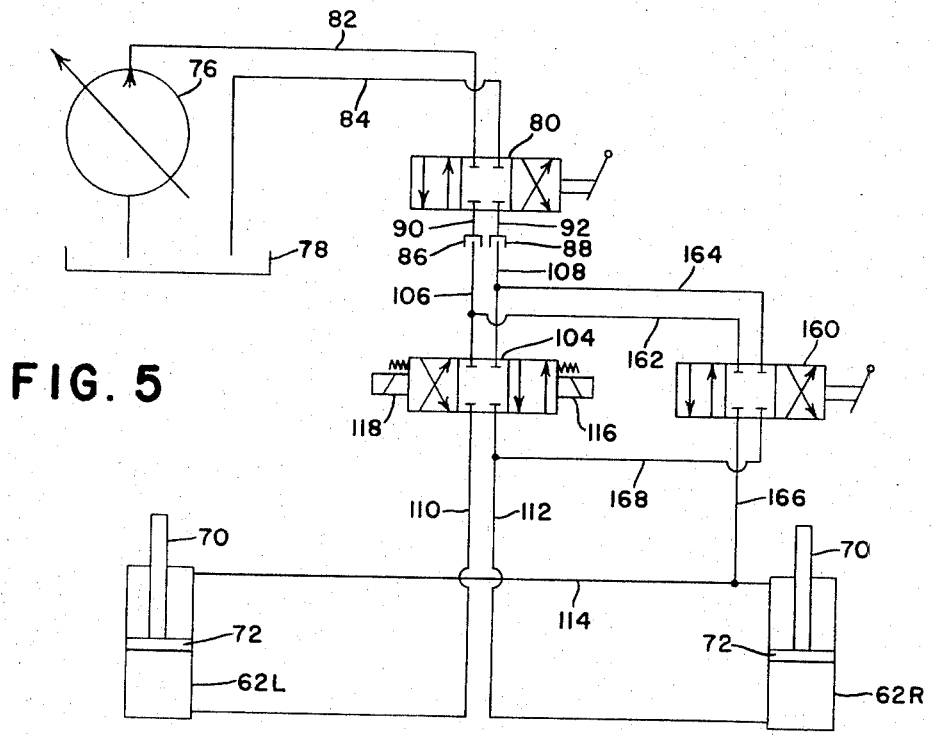

FIG. 5 illustrates the hydraulic system of the side draft control system as used on a tractor having only a single pair of remote function outlets 86 and 88. When the tractor has only a single pair of remote function outlets, it is necessary to make additional provisions for adjusting the average working position of the toolbar relative to the ground surface. This is accomplished by mounting a four-way directional flow control valve 160 on the tractor in a position near the operator's platform, interconnecting one side of valve 160 with the fluid lines 106 and 108 with an additional pair of fluid lines 162 and 164, and interconnecting the other side of valve 160 with the fluid lines 114 and 112 by fluid lines 166 and 168. The hydraulic system illustrated in FIG. 5 is essentially the same as that illustrated in FIG. 4 in that it provides a means of bypassing the valve 104 to interconnect the opposite ends of the cylinder 62R with the pump 76 and reservoir 78. The hydraulic system illustrated in FIG. 5 also operates in exactly the same manner as that illustrated in FIG. 4 and differs from the hydraulic system illustrated in FIG. 4 only in that it makes provision for the use of the side draft control system with a tractor having a hydraulic system with only a single pair of remote function outlets.

From the foregoing description of construction and operation, it can be seen that the present invention provides a means of maintaining balanced draft loads on a tractor and also of maintaining a constant average working depth of tools on an implement propelled by the tractor while maintaining the balanced draft loads.

Having thus described the construction and the operation of a preferred embodiment of the invention, various modifications within the spirit and scope of the invention will become apparent to those skilled in the art and can be made without departing from the underlying principles of the invention as defined in the claims.

I claim:

1. A side draft control system for use with a tractor having a source of fluid pressure and vertically movable power-operated hitch means and an implement connected to the tractor hitch means to be raised and lowered thereby between working and transport positions, the system comprising: a pair of gauge wheels adjustably secured to the implement in positions on opposite sides of the tractor hitch to control the working position of the implement with respect to the ground; a pair of hydraulic cylinders connected between the frame and gauge wheels to vertically adjust the frame with respect to the gauge wheels; means including valve means interconnecting the hydraulic cylinders and the source; the valve means being movable to opposite sides of a neutral fluid blocking position to selectively interconnect the source with one or the other of the hydraulic cylinders; sensing means on the tractor operatively interconnected with the valve means and responsive to unequal draft loads on opposite sides of the tractor hitch to move the valve means from its neutral position in a direction to interconnect the hydraulic cylinder on the high draft side of the implement with the source; and means forming part of the sensing means responsive to raising movement of the hitch means and implement to the transport position to render the sensing means inoperative.

2. The side draft control system set forth in claim 1 wherein the valve means is a solenoid valve, the sensing means includes an electrical source, an electrical circuit interconnecting the electrical source and the solenoid valve, and switch means in the circuit for opening and closing the circuit, the switch means being mounted on the tractor in a position to be operated by lateral movement of the hitch means caused by unequal draft loads on opposite sides of the hitch means.

3. A side draft control system for use with a tractor having a source of fluid pressure, a fluid reservoir, and a power-operated hitch movable through a vertical range including a plurality of rearwardly extending links pivotally mounted on the tractor for limited universal movement, and an implement having a transversely elongated frame connected to the links to be raised and lowered thereby between working and transport positions, the system comprising: a pair of gauge wheels adjustably secured to the frame on opposite sides of the hitch to control the working position of the frame; a pair of hydraulic cylinders connected between the gauge wheels and frame to vertically adjust the frame on the gauge wheels; means including valve means interconnecting the hydraulic cylinders with the source and reservoir; the valve means being movable to opposite sides of a neutral fluid blocking position to selectively and alternately interconnect the source with one cylinder and the reservoir with the other cylinder; sensing means on the tractor operatively interconnected with the valve means and responsive to unequal draft loads on opposite sides of the hitch to move the valve means from the neutral position in a direction to interconnect the hydraulic cylinder on the high draft side of the implement with the source and the hydraulic cylinder on the low draft side of the implement with the reservoir to thereby maintain a substantially constant average working position of the frame with respect to the ground while maintaining substantially equal draft loads on opposite sides of the hitch, and the sensing means including means to render the sensing means inoperative when the implement is raised to the transport position.

4. The side draft control system set forth in claim 3 wherein the sensing means is mounted on the tractor in a position to be contacted by at least one of the hitch links upon lateral movement of the hitch links as the result of unequal draft loads on opposite sides of the hitch.

5. The side draft control system set forth in claim 4 wherein the valve means is a double solenoid valve and the sensing means includes a pair of normally open switches mounted on the tractor on opposite sides of one of the hitch links to be contacted and closed thereby upon lateral movement thereof, an electrical source, and a pair of electrical circuits each including the electrical source, one of the switches and one of the solenoids of the double solenoid valve whereby lateral movement of the one link caused by unequal draft loads on opposite sides of the tractor hitch results in the closing of one of the switches, activation of one of the solenoids, and movement of the solenoid valve from the neutral position.

6. The side draft control system set forth in claim 5 wherein the means to render the sensing means inoperative includes mercury switch means interposed in the electrical circuits and supported on one of the link means to be open and closed in response to raising and lowering pivotal movement of the links whereby when the implement is raised to the transport position the mercury switch means is opened.

7. The side draft control system set forth in claim 6 wherein each of the cylinders is double acting, has rod and anchor ends, and is connected between the frame and its respective gauge wheel to raise the frame with respect to the gauge wheel upon extension, the means interconnecting the hydraulic cylinder with the source and reservoir interconnect the anchor ends of the cylinder with the source and reservoir, and fluid line means interconnect the rod ends of the cylinders.

8. The side draft control system set forth in claim 7 wherein a pair of fluid lines bypass the valve means and interconnect the ends of one of the cylinders with the source and reservoir, and a directional control valve is interposed in the pair of fluid lines, the directional control valve being a three-position, four-way valve movable to either side of a fluid blocking position to selectively and alternately interconnect the source with one end of the one hydraulic cylinder and the reservoir with the other end of the one hydraulic cylinder whereby the average working position of the frame with respect to the ground may be varied.

9. A side draft control system for use with a tractor having a source of fluid pressure, a fluid reservoir, and a power-operated hitch movable through a vertical range including a pair of lower draft links and an upper compression link pivotally mounted on the tractor for limited universal movement, and an implement having a transversely elongated frame integrally connected to the hitch links to be raised and lowered thereby between lowered working and raised transport positions, the system comprising: a pair of gauge wheels adjustably secured to the frame on opposite sides of the hitch to control the working position of the frame; a pair of hydraulic cylinders connected between the frame and gauge wheels to vertically adjust the frame on the gauge wheels; means including valve means interconnecting the hydraulic cylinders with the source and reservoir; the valve means being movable to opposite sides of a neutral position to selectively and alternately interconnect one hydraulic cylinder with the source and the other hydraulic cylinder with the reservoir; sensing means on the tractor operatively interconnected with the valve means and responsive to lateral movement of the upper compression link resulting from unequal draft loads on opposite sides of the tractor hitch to move the valve means from the neutral position in a direction to interconnect the hydraulic cylinder on the high draft side of the implement frame with the source and the hydraulic cylinder on the low draft side of the implement frame with the reservoir whereby the draft loads on opposite sides of the tractor hitch are maintained substantially equal and the average working position of the implement frame is maintained substantially constant.

10. The side draft control system set forth in claim 9 wherein the valve means includes a double solenoid valve and the sensing means includes a pair of normally opened switches mounted on opposite sides of the compression links to be contacted and closed thereby upon lateral movement of the upper link in response to unequal draft loads on opposite sides of the tractor hitch, an electrical source, and a pair of electrical circuits, each circuit including the electrical source, one of the switches and one of the solenoids.

11. The side draft control system set forth in claim 10 wherein mercury switch means is interposed in the pair of circuits and supported by the compression link to be opened and closed in response to raising and lowering pivotal movement of the compression link whereby when the implement frame is raised to the transport position by the tractor hitch the mercury switch means is opened.

12. The side draft control system set forth in claim 10 wherein a switch support is pivotally mounted on the tractor for vertical pivotal movement about a transverse axis and extends generally rearwardly from the axis, the supporting member includes a pair of arms extending alongside the compression link and an inverted U-shaped switch base interconnecting the rear ends of the arms and bridging the compression link, and the pair of normally opened switches are secured to and carried by the U-shaped switch base.

13. The side draft control system set forth in claim 12 wherein the pair of normally opened switches are push button switches and are mounted on the switch support with the push buttons facing each other and on opposite sides of the centerline of the compression link when the compression link is in a centered position, a strip of stiff material is securely anchored on the compression link and extends between the push buttons of the pair of normally opened switches, whereby, upon lateral movement of the compression link the strip will contact one of the push buttons and close one of the switches.

14. The side draft control system set forth in claim 13 wherein the strip of stiff material is anchored at one end and has a free end extending between the push buttons of the switches whereby the strip of stiff material will yield laterally if the compression link moves laterally beyond what is required to close one of the pair of normally open switches.

15. A side draft control system for use with a tractor having a source of fluid pressure, a fluid reservoir, and a vertically movable, power-operated hitch including a pair of lower draft links and an upper compression link connected to the tractor for limited universal movement, and an implement including a transversely elongated frame connected to the tractor hitch to be raised and lowered thereby between raised transport and lowered working positions, the system comprising: a pair of gauge wheels adjustably mounted on the implement frame on opposite sides of the tractor hitch to control the working position of the implement frame relative to the ground; a pair of hydraulic cylinders connected between the frame and gauge wheels to raise and lower the frame relative to the gauge wheels; fluid line means extending between the hydraulic cylinders and the tractor source and reservoir; solenoid valve means interposed in the fluid line means and movable, when activated, to opposite sides of a neutral fluid blocking position to selectively and alternately interconnect one hydraulic cylinder with the source and the other hydraulic cylinder with the reservoir; and electrical sensing means on the tractor interconnected with the solenoid valve and responsive to lateral movement of one of the hitch links to activate the solenoid valve to interconnect the hydraulic cylinder on the high draft side of the implement frame with the source and the hydraulic cylinder on the low draft side of the implement frame with the reservoir.

16. A side draft control system for use with a tractor having a source of fluid pressure, a fluid reservoir, and a vertically movable, power-operated hitch including a plurality of rearwardly extending links having forward ends connected to the tractor for limited universal movement, and an implement including a frame connected to the tractor hitch to be raised and lowered thereby between raised transport and lowered working positions, the system comprising: a pair of gauge wheels adjustably mounted on the implement frame on opposite sides of the tractor hitch to control the working position of the implement frame relative to the ground; a pair of hydraulic cylinders connected between the frame and gauge wheels to raise and lower the frame relative to the gauge wheels; fluid line means extending between the hydraulic cylinders and the tractor source and reservoir; solenoid valve means interposed in the fluid line means and movable, when activated, to either side of a neutral fluid blocking position to selectively and alternately interconnect one hydraulic cylinder with the source and the other hydraulic cylinder with the reservoir; and electrical sensing means on the tractor interconnected with the solenoid valve responsive to lateral movement of one of the hitch links to activate the solenoid valve to interconnect the hydraulic cylinder on the high draft side of the implement frame with the source and the hydraulic cylinder on the low draft side of the implement frame with the reservoir.

* * * * *